United States Patent [19]

Howe

[11] Patent Number: 4,645,397
[45] Date of Patent: Feb. 24, 1987

[54] TIRE THEFT PREVENTION DEVICE

[75] Inventor: Blair E. Howe, Costa Mesa, Calif.

[73] Assignee: James Padelford, Anaheim, Calif.

[21] Appl. No.: 653,322

[22] Filed: Sep. 24, 1984

[51] Int. Cl.⁴ ............................................. F16B 37/14
[52] U.S. Cl. .................................... 411/431; 411/372; 411/910
[58] Field of Search ................................ 411/371–373, 411/429, 431, 910, 911, 508–510, 512, 437; 70/229, 231

[56] References Cited

U.S. PATENT DOCUMENTS

| | | | |
|---|---|---|---|
| 306,875 | 10/1884 | Thatcher | 411/429 |
| 822,025 | 5/1906 | Sisco . | |
| 1,003,211 | 9/1911 | Shepard . | |
| 1,447,564 | 3/1923 | Norlund et al. . | |
| 1,751,779 | 1/1927 | Von Senden . | |
| 1,759,917 | 6/1927 | Ross . | |
| 1,887,557 | 11/1932 | Kiedel . | |
| 1,912,872 | 10/1932 | Trautner . | |
| 2,033,371 | 3/1936 | Benaggio | 292/307 |
| 2,054,060 | 9/1936 | Morris | 40/125 |
| 2,316,695 | 4/1943 | Jaffa . | |
| 3,174,383 | 3/1965 | Heil . | |
| 3,222,976 | 12/1965 | Holman . | |
| 3,241,427 | 3/1966 | Bosler . | |
| 3,298,272 | 10/1964 | Henderson . | |
| 3,423,971 | 1/1969 | Brunelli | 70/231 |
| 3,492,841 | 2/1970 | Ipri | 70/231 |
| 3,540,245 | 5/1970 | Pope | 70/231 |
| 3,975,935 | 8/1976 | Masterson | 70/232 |
| 3,978,698 | 9/1976 | Ono | 70/229 |
| 4,037,515 | 7/1977 | Kesselman . | |
| 4,105,862 | 8/1978 | Hoehn | 411/437 |
| 4,239,710 | 12/1980 | Sato | 261/65 |
| 4,302,137 | 11/1981 | Hart . | |
| 4,324,516 | 4/1982 | Sain et al. | 411/910 |
| 4,374,509 | 2/1983 | Kawabata | 123/146.5 |
| 4,400,123 | 8/1983 | Dunegan | 411/373 |
| 4,521,146 | 6/1985 | Wharton | 411/910 |

OTHER PUBLICATIONS

Tattle Cap brochure, "Put a Cap on Tire Theft," (date unknown).

Primary Examiner—Gary L. Smith
Assistant Examiner—Neill Wilson
Attorney, Agent, or Firm—Knobbe, Martens, Olson and Bear

[57] ABSTRACT

This invention is directed to protection against theft or other unauthorized removal of articles secured by threaded nuts or the like, particularly truck tires. A tamper-proof fastener is provided having a locking cap which engages the underlying lug bolt and a seal which surrounds the locking cap and the lug nut of the tire to be secured. The seal rotates freely about the locking cap and the lug nut so as to prevent anyone from loosening the lug nut without first breaking the seal.

10 Claims, 6 Drawing Figures

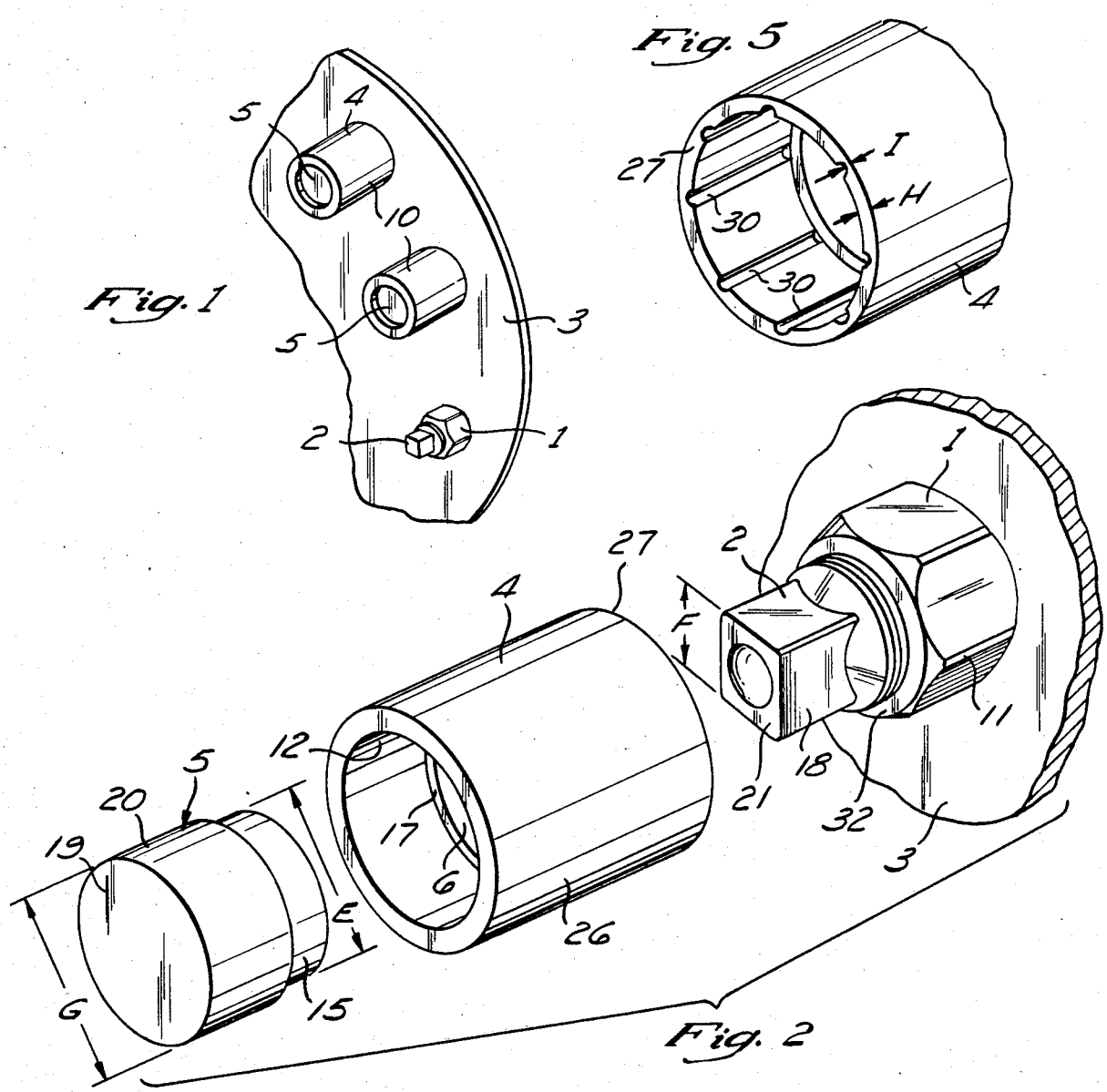
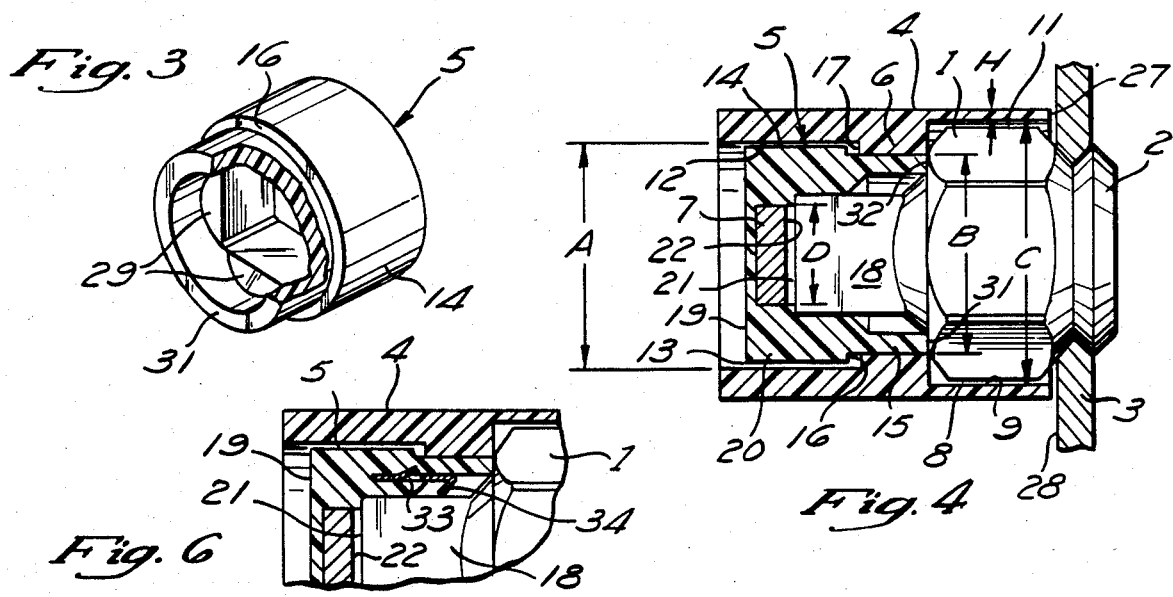

TIRE THEFT PREVENTION DEVICE

BACKGROUND OF THE INVENTION

Each year the transportation industry loses millions of dollars through tire pilferage and tire theft. Many companies experience difficulty with the so called "tire swap outs" wherein a driver exchanges the tires on his truck for older or inferior tires and some cash. It is an object of this invention to provide a reliable tamper indicator so that one can easily detect when the tires on a vehicle have been removed or tampered with. A second objective of this invention is to deter tire thieves.

Many of the prior devices designed to prevent tire theft operate on the principle of a lock which is removable only with a special key. Of course, the driver of the vehicle must necessarily carry a copy of the lock key with him so that he may repair a flat or damaged tire. Since a person with the key can easily remove the tire without leaving any indication that any tampering had taken place, these devices are ineffective as tamper indicators.

Other prior art devices use a break-off nut which is connected to a smooth surfaced fastening nut. The break-off nut is broken away from the fastening nut when it is tightened beyond a certain torque level. Removal of the fastened object is thereby rendered more difficult or impossible because the rounded surfaces of the fastening nut cannot be gripped by a conventional wrench. Prior art devices of this type require specially machined fasteners. In addition, the torque requirements of the fastening nut must be determined for each application so that the break-off nut can be designed accordingly. Furthermore, these prior art devices are impractical because they are extremely difficult to remove once the breakable fastener has been sheared off. This makes needful tire replacement very difficult.

SUMMARY OF THE INVENTION

The present invention essentially consists of a plastic sleeve and a deformable locking cap. The locking cap has two different outside diameters and is dimensioned so that it will fit tightly over the end of a lug bolt. The plastic sleeve is essentially a plastic cylinder with an inner flange. One end of the cylinder fits over the lug nut and thereby prevents access to the nut except after the sleeve has been removed. The locking cap is forced onto the end of the lug bolt and into to the other end of the cylinder. The sleeve's inner flange has an inner diameter which is smaller than the largest outside diameter of the locking cap. Therefore, once the locking cap is in place, the inner flange of the sleeve prevents the seal from being axially removed from the lug bolt.

The device is placed on the lugs of a truck by placing the plastic sleeve over the lug bolt and lug nut, aligning the cap with the top of the lug bolt, and forcing the cap into place. The act of forcing the cap over the lug bolt deforms one of its inner cross sections so that the cap grips the underlying lug bolt. Once the cap has been forced into place over the lug bolt it is covered by the rotatable sleeve so that one cannot remove the cap or the lug nut without first breaking the sleeve, thereby leaving a tell-tale visual indication that the tire has been removed or at least removal has been attempted.

The present invention does not need a specially machined fastener. Moreover, since the present invention is not attached until after the underlying nut has been tightened, there is no need to design the present invention with respect to the torque requirements of the underlying nut and lug bolt. A further advantage of the present invention is that it leaves the lug nut with hexagonal sides so that, after the rotatable sleeve has been broken, the lug nut can be easily removed with a conventional wrench.

Additionally, since the present device can be attached without first removing the lug nut which it is intended to seal, the device is much easier to install than the prior art devices which required the removal of the lug nut in order to be attached thereon.

These and other features of the present invention are best understood through reference to the drawings.

BRIEF DESCRIPTION OF THE DRAWINGS

FIG. 1 is a perspective view of a tamper-proof fastener embodying the teachings of the present invention.

FIG. 2 is an exploded perspective view of a tamper-proof fastener embodying the teachings of the present invention.

FIG. 3 is a schematic drawing showing the preferred embodiment of the locking cap of the present invention.

FIG. 4 is a schematic drawing showing a bolt secured with the tamper-proof device of the present invention.

FIG. 5 is a perspective view of an alternative embodiment of the rotatable seal.

FIG. 6 is a schematic drawing of an alternative embodiment of the locking cap.

DETAILED DESCRIPTION OF THE PREFERRED EMBODIMENT

Referring first to FIG. 1, fastening means for a vehicle wheel comprises a threaded wheel stud or bolt 2 which extends from a vehicle hub (not shown) to be slidably received through a hole in a vehicle wheel 3. A nut 1 is threadably engaged on the stud 2 so as to prevent the separation of the wheel from the hub. The tamper-proof device 10 of the present invention is shown in position over two of the three fastening means.

FIG. 2 shows a tire theft prevention device, in accordance with the preferred embodiment of the present invention, in a position to be attached to a fastener. A threaded stud 2 protrudes from a vehicle hub (not shown), through the wheel 3, and has a nut 1 threaded upon it. The sealing sleeve 4 is shown about to be positioned over the fastening assembly. A portion of the inner flange 6 of the sleeve 4 is visible.

The sleeve is essentially cylindrical in shape and, as can be seen best in FIG. 4, has three inner diameters, A, B, and C. While this sleeve can be from a variety of materials, the material GT Styrene has been found to produce good results. The inner diameter, C, defined by inner face 9, slightly exceeds the outer diameter of the nut 1, so that there is defined a slip gap 8 between the facially opposed surfaces 9 and 11. The slip gap enables the slip ring to rotate freely about the nut 1 so as to prevent a gripping member from turning the nut 1 by turning the sleeve 4. In an exemplary embodiment of this invention, the slip gap 8 is 1/32 of an inch wide.

The sleeve 4 has a flange 6 for preventing the sleeve 4 from being axially removed from the nut 1 after the cap 5 has been forced onto the end of the stud 2. Flange 6 has an inner diameter B which is 1⅜" in the exemplary embodiment. This diameter B is slightly smaller than the typical 1 7/16" outer diameter G of the locking cap 5. Thus, when cap 5 is attached to the end of stud 2, the flange 6 prevents movement of the sleeve 4 in the axial direction of the stud 2 and thereby prevents removal of the sleeve 4 from the nut 1. Preferably, the sleeve 4 is of sufficient length so that it will cover the nut 1 and allow the locking cap 5 to be approximately $\frac{1}{8}''$ recessed within the sleeve 4 when the locking cap 5 is in place. In the exemplary embodiment, the sleeve 4 is $2\frac{1}{8}''$ long, the locking cap 5 measures 15/16'' along its axis and the bolt 2 is $\frac{7}{8}''$ wide.

The inner diameter A of the sleeve 4 slightly exceeds the larger outside diameter G of the locking cap 5 so as to form a slip gap 13 between the inner opposed faces 12 and 14 of the sleeve 4 and the locking cap 5 respectively. In the exemplary embodiment, the diameter G of the cap 5 is 1 7/16'', the diameter A of the sleeve 4 is $1\frac{1}{2}''$ and the slip gap 13 is 1/32'' wide. The slip gap 13 allows the sleeve 4 to rotate freely about the locking cap 5 so as to prevent a gripping member from turning the cap 5 by rotating the sleeve 4.

The locking cap 5 has a radially inward extending shoulder 15. In the exemplary embodiment, the diameter E of the shoulder 15 is 1 5/16'' and the diameter G of the head 20 of locking cap 5 is 1 7/16''. This reduction in diameter from the head 20 to the shoulder 15 of the cap 5 forms a planar annular shoulder 16 which is in the exemplary embodiment is 1/16'' wide.

The cap 5 is dimensioned so that surface 31 of the shoulder 15 will contact surface 32 of the nut 1 approximately 1/16'' before surface 16 of the cap 5 contacts surface 17 of the flange 6 of the sleeve 4. The sleeve 4 will therefore have a small amount of play in the axial direction of bolt 2.

FIG. 3 is a schematic drawing of the locking cap 5. Part of the cap is shown broken away so as to show the deformable inner members 29 which deform to grip the end 18 of the lug bolt 2. The deformable members 29 are designed to change the inner shape of the head 20 of the cap 5 so that this inner area matches the shape of the portion 18 of the bolt 2 which protrudes through the nut 1. In the embodiment shown the deformable members 29 are constructed to form a square cross-section but it is to be understood that deformable members 29 may be designed so as to create any desired cross-sectional shape.

The internal diameter D formed by the deformable members 29 is smaller than the length of the cross-section along line F of the bolt 2 (FIG. 2). In one exemplary embodiment, the cross-section F of the bolt 2 is 13/16'' while the diameter D formed by the deformable members 29 is $\frac{3}{4}''$. However, due to the fact that the members 29 are formed of a deformable material, i.e., acetal or polyester resin, the cap 5 may be forced over the portion 18 of the bolt 2. The force should be applied to the surface 19 of the head 20 of the cap 5. A metal piece 7 is advantageously embedded in the head 20 of cap 5 to add structural strength.

After a sufficient force has been applied to the cap 5 the structure of FIG. 4 results. The deformable members 29 are made to be of such a length that surface 31 of the cap 5 will come into contact with surface 32 of the nut 1 before surface 21 of the bolt 2 contacts surface 22 of the cap 5. The sleeve 4 will then cover all of the cap 5 and the nut 1.

The surface 19 of the cap 5 can be embossed with the logo of the company using the seal or with any other suitable decorative design. The sleeve 4 can be provided with a serial number embossed upon surface 26 so as to prevent anyone from merely changing the sleeve 4 and thereby defeating the tamper-proof nature of the device.

The tire theft prevention device described above operates as follows. The sealing sleeve 4 is mounted over the lug nut 1 and lug bolt 2. Then the locking cap 5 is forced into place over the end of the lug bolt 2 by applying a force (using, for example, a hammer) to the surface 19 of the cap 5. Sleeve 4 is freely rotatable about the locking cap 5 and the nut 1 so that rotation of the sleeve 4 cannot result in rotation of the nut 1. Since the sleeve 4 also prevents a tool from gripping the nut 1, there is no way to remove the nut 1 from the bolt 2 without first breaking the sleeve 4.

If one attempts to force the cap 5 and the sleeve 4 off of the bolt 1 by inserting a screwdriver or other type of tool between surface 27 of sleeve 4 and surface 28 of the wheel 3 (FIG. 4) the sleeve 4 is so constructed that it will break before cap 5 could be pryed off the end of the bolt 1. This is achieved by forming the end wall of the sleeve 4 with a sufficiently thin wall thickness H (of the order of 1/16''). As a result, once the cap 5 has been forced into place, the sealing sleeve 4 cannot be axially removed from the lug bolt 2 without physically breaking it, thus giving immediate visual notice that the tire has been tampered with or removed.

In an alternative embodiment, FIG. 5, the sleeve 4 is made with stress grooves 30. The thickness H of the sleeve 4 is reduced from 1/16'' to 0.02'' along these grooves 30. This reduction in the thickness H further reduces the chance that someone can successfully pry cap 5 off of bolt 2 by inserting a prying tool between surface 28 of the wheel 3 and surface 27 of the sleeve 4 (FIG. 4) without breaking the sleeve 4 in the process.

Devices constructed in accordance with this invention have operated quite satisfactorily and confirm that physical deformation alone of the cap 5 (when it is driven onto the wheel stud 2) is sufficient to prevent the cap from being removed without having to break the sleeve 4. Alternative constructions of cap 5 are, however, within the scope of this invention. One such alternative is shown in FIG. 6. In this embodiment hooks 33 are embedded in the head 20 of the cap 5a. Although only one hook 33 is shown in FIG. 5 it is to be understood that a plurality of hooks can be used. The outlying portion 34 of the hook is shaped such that the hook does not interfere with axial movement of the cap as it is driven onto the lug bolt 2, whereas the hook shape at 34 applies a substantial bias frictional force against removal of the cap once it has been forced onto the bolt 2. As a result, the hooks 33 grip the portion 18 of the bolt 2 when the cap is forced on and thereby increase the amount of force needed to pry the cap 5 off of the bolt 2.

I claim:

1. A tire theft prevention device for covering a tire lug nut and lug bolt where the lug bolt is of the type that has a threaded portion terminating in a protruding unthreaded portion having sides arranged parallel to the central axis of the bolt, said device comprising:

a locking cap having first and second ends, said first end being closed and said second end having an open cavity having inner sides, the inner sides of said cavity having at least some portions thereof which are sized and shaped to provide a secure axial friction fit with the unthreaded projection on the lug bolt when an axial force is directed onto said second end of said locking cap; and a substantially tubular sleeve sized to surround the lug bolt, the lug nut, and the length of the locking cap, said sleeve being held in place by said locking cap and having a thickness in relation to the brittleness of the material which forms the sleeve such that in order to remove the locking cap, the sleeve must be broken, so as to leave a visually detectable indication of tampering.

2. The apparatus of claim 1, wherein the inner surface of said sleeve and the exterior surface of said locking cap are round.

3. The apparatus of claim 2, wherein said sleeve has an inner flange having an inside diameter less than that of the remainder of the sleeve, said locking cap having two portions with different outside diameters, an axially facing shoulder on said locking cap formed where said portions meet, the flange on the sleeve abutting against said shoulder to prevent said sleeve from sliding off said nut in an axial direction.

4. The apparatus of claim 2, wherein the portion of the sleeve which surrounds the locking cap has an inside diameter which is larger than the outside diameter of the locking cap so as to form a predetermined clearance between the locking cap and the sleeve, said clearance being sufficiently large to permit said sleeve to rotate relative to said locking cap, yet sufficiently small to prevent a device which can disengage said locking cap from said bolt from being inserted between said sleeve and said locking cap.

5. The apparatus of claim 1, wherein said sleeve completely surrounds the periphery of the locking cap and the periphery of the unthreaded portion of the bolt.

6. The apparatus of claim 1, wherein the unthreaded portion of said lug bolt and said locking cap cavity have flat sides which form substantially square, mating cross-sections.

7. The apparatus of claim 1, wherein the inner sides of said cavity are deformable and sized so that said cavity has a smaller cross-section than said unthreaded portion, said sides deforming upon application of said axial force to expand the cross-section of said cavity and allow said locking cap to have a secure friction fit with said unthreaded portion.

8. The apparatus of claim 1, wherein the inner sides of said cavity include inwardly protruding hooks, said hooks being biased into engagement with the unthreaded portion of the lug bolt to prevent removal of the locking cap from said lug bolt.

9. An apparatus for removably fastening two objects together such that the objects cannot be unfastened without leaving a visual indication that they have been tampered with, said apparatus comprising:

a bolt secured to one of said objects, said bolt having a threaded portion and terminating in an unthreaded end portion, said unthreaded end portion having flat sides arranged parallel to the central axis of the bolt, said bolt passing through a hole in the other object;

a nut which threads onto the threaded portion of said bolt to secure said objects together;

a cup-shaped locking cap having a closed end and an open end, said open end being defined by a cavity having inner sides within said locking cap, the inner sides of said cavity having at least some portions thereof which are sized and shaped to provide a secure axial friction fit with the unthreaded end of the lug bolt when an axial force is directed onto said closed end of said locking cap, removal of said locking cap being required to unthread said nut from said bolt and unfasten said objects; and a substantially tubular sleeve surrounding the lug bolt, the lug nut, and the locking cap, said sleeve being held in place by said locking cap and having a thickness in relation to the brittleness of the material which forms the sleeve such that in order to remove the locking cap, the sleeve must be broken, so as to leave a visually detectable indication of tampering.

10. A method of fastening two objects together so that the objects cannot be unfastened without leaving an indication that they had been unfastened, said method comprising the steps of:

fastening the objects together with a bolt of the type having a threaded portion terminating in a protruding unthreaded portion with sides arranged parallel to the central axis of the bolt, and a nut;

sliding a tubular sleeve over said nut and said bolt;

forcing a locking cap over the unthreaded portion of the lug bolt, said locking cap having first and second ends, said first end being closed and said second end having an open cavity having inner sides, said locking cap being forced over the lug bolt by applying an axially directed force to the second end of the locking cap, the inner sides of said cavity being sized relative to the unthreaded portion of said lug bolt so as to provide a secure, frictional interference fit between the unthreaded portion of said lug bolt and said locking cap.

* * * * *